United States Patent
Needle (12)

(10) Patent No.: US 12,467,832 B2
(45) Date of Patent: Nov. 11, 2025

(54) REVERSIBLE FLOW SAMPLER

(71) Applicant: BL TECHNOLOGIES, INC., Minnetonka, MN (US)

(72) Inventor: Stanley Needle, Louisville, CO (US)

(73) Assignee: BL TECHNOLOGIES, INC.

( * ) Notice: Subject to any disclaimer, the term of this patent is extended or adjusted under 35 U.S.C. 154(b) by 305 days.

(21) Appl. No.: 18/277,680

(22) PCT Filed: Feb. 16, 2022

(86) PCT No.: PCT/US2022/016522
§ 371 (c)(1),
(2) Date: Aug. 17, 2023

(87) PCT Pub. No.: WO2022/177934
PCT Pub. Date: Aug. 25, 2022

(65) Prior Publication Data
US 2024/0133776 A1 Apr. 25, 2024
US 2024/0230481 A9 Jul. 11, 2024

Related U.S. Application Data

(60) Provisional application No. 63/150,258, filed on Feb. 17, 2021.

(51) Int. Cl.
*G01N 1/20* (2006.01)

(52) U.S. Cl.
CPC ................ *G01N 1/2035* (2013.01)

(58) Field of Classification Search
CPC ......... G01N 1/2042; G01N 2001/2057; G01N 2035/047; G01N 2030/382; G01N 1/2035
(Continued)

(56) References Cited

U.S. PATENT DOCUMENTS

| 5,132,094 A | 7/1992 | Godec et al. |
|---|---|---|
| 5,902,751 A | 5/1999 | Godec et al. |

(Continued)

FOREIGN PATENT DOCUMENTS

| CN | 108663237 A | 10/2018 |
|---|---|---|
| WO | 199604540 A1 | 2/1996 |

OTHER PUBLICATIONS

International Search Report and Written Opinion for corresponding International Patent Application No. PCT/US2022/016522, mailed May 19, 2022.

(Continued)

*Primary Examiner* — John E Breene
*Assistant Examiner* — Truong D Phan
(74) *Attorney, Agent, or Firm* — Meunier Carlin & Curfman LLC

(57) ABSTRACT

Various implementations include a reversible flow sampler including a housing, a housing cover, and a shuttle. The housing defines a sampler chamber with an inlet and an outlet, a first opening, and a second opening. The shuttle is movably disposed within the housing and coupled to the housing cover. The shuttle has a first shuttle position and a second shuttle position. In the first shuttle position, the shuttle fluidly connects the first opening with the sample chamber inlet and fluidly connects the second opening with the sample chamber outlet. In the second shuttle position, the shuttle fluidly connects the second opening with the sample chamber inlet and fluidly connects the first opening with the sample chamber outlet.

20 Claims, 15 Drawing Sheets

(58) Field of Classification Search
USPC .............. 73/863.41, 863.24, 863.71, 864.83, 73/863.53–863.54
See application file for complete search history.

(56) References Cited

U.S. PATENT DOCUMENTS 9,074,967 B2  7/2015 Clay
2023/0105360 A1* 4/2023 Crockett ................... B01L 7/52
                                                      435/6.12

OTHER PUBLICATIONS

International Preliminary Report on Patentability dated Aug. 31, 2023.

* cited by examiner

REVERSIBLE FLOW SAMPLER

CROSS-REFERENCE TO RELATED APPLICATIONS

The present application is a § 371 National Stage of International Application No. PCT/US2022/016522, filed Feb. 16, 2022, which claims priority to and the benefit of U.S. Provisional Patent Application No. 63/150,258, filed Feb. 17, 2021, both of which are incorporated herein by reference in their entireties.

BACKGROUND

In some manufacturing processes, various components of the process must be cleaned out between runs of products produced by the process or on a regular basis. These components may include, for example, tanks, pipes, boilers, reactors, and other vessels and the like. Often, a clean-in-place ("CIP") skid is used during this cleaning process and the effluent from the cleaning process as it passes through the CIP skid may be sampled during the cleaning to look for various contaminants and/or product residue remaining in the process components. In some instances, fluids from the cleaning process are introduced to a sampler, and the sampler provides a sample of the cleaning fluids to an analyzer. An exemplary sampler is shown and described in U.S. Pat. No. 9,074,967, filed Dec. 20, 2012, which is fully incorporated by reference and made a part hereof. Analyzers are used to examine the effluent for various contaminants and/or product residue. Such analyzers may include, for example, total organic carbon ("TOC") analyzers. TOC analyzers are used for, among other purposes, cleaning validation of systems containing organic carbon. Descriptions of TOC analyzers can be found in U.S. Pat. No. 5,132,094, filed Mar. 2, 1990, and U.S. Pat. No. 5,902,751, filed Feb. 10, 1997, both of which are incorporated herein by reference in their entireties. For example, a TOC may be used to test liquids used in cleaning equipment used various processes, including, for example, in a pharmaceutical process.

Often, one or both of the sampler and the analyzer require cleaning between obtaining and/or analyzing samples. However, in current samplers, flow is directed to the bottom of the sample chamber, and there are not many effective methods to clean the sample chamber in between samples. If air is directed through the lines that direct fluid to the bottom of the sampler chamber in an attempt to purge liquids residing in the sample chamber, it only bubbles through the liquid, and fails to evacuate the liquid. Consequently, cross contamination between subsequent samples could occur. Cross contamination between subsequent samples can lead to inaccurate analysis results.

Accordingly, a need exists for a sampler that can effectively purge liquid from the sample chamber to prevent cross contamination and, thus, acquire the most accurate analysis results from the sample chamber.

SUMMARY

The present disclosure relates to apparatuses, systems and methods for cleaning, blowing down, clearing, purging (all used synonymously herein) a sampler.

One implementation of the present disclosure is a reversible flow sampler. The sampler includes a housing, a housing cover that is movable between an open position and closed position, and a shuttle. The housing defines a sample chamber having an inlet and an outlet, a first opening and a second opening. The shuttle is movably disposed within the housing and coupled to the housing cover. The shuttle has a first shuttle position and a second shuttle position. In the first shuttle position, the shuttle fluidly connects the first opening with the sample chamber inlet and fluidly connects the second opening with the sample chamber outlet. In the second shuttle position, the shuttle fluidly connects the second opening with the sample chamber inlet and fluidly connects the first opening with the sample chamber outlet.

In some implementations, in the first shuttle position, the shuttle is located such that a first fluid enters the first opening and exits the second opening.

In some implementations, the first fluid is a liquid. In some implementations, the first fluid is sample water. In some implementations, the first fluid is clean water. In some implementations, the first fluid is at ambient pressure within the sample chamber.

In some implementations, the closed position of the housing cover is airtight.

In some implementations, in the second shuttle position, the shuttle is located such that a second fluid enters the second opening and exits the first opening.

In some implementations, the second fluid is a gas. In some implementations, the second fluid is air.

In some implementations, the second fluid is a liquid. In some implementations, the second fluid is sample water. In some implementations, the second fluid is clean water.

In some implementations, the second fluid is at a pressure above ambient pressure within the sample chamber. In some implementations, the pressure of the second fluid, as it enters the sampler, is approximately 10 pounds per square in gauge (psig).

In some implementations, in the second shuttle position, the shuttle causes the housing cover to be in the closed position such that the sample chamber can be at the pressure above ambient pressure.

In some implementations, moving the housing cover from the closed position to the open position causes the shuttle to move from the first shuttle position to the second shuttle position.

In some implementations, the sampler further includes an actuator. In some implementations, the actuator is coupled to the shuttle, and the actuator is configured to move the shuttle from the first shuttle position to the second shuttle position.

In some implementations, the sampler further includes a fluid source, and the shuttle is disposed between the fluid source and the first and second openings.

In some implementations, the sample chamber inlet further includes a vial receptacle. In some implementations, the vial receptacle includes one or more needles.

In some implementations, at least a portion of the shuttle is disposed between the first opening and the second opening.

In some implementations, the shuttle includes at least one radially extending protrusion disposed between the first opening and the second opening. In some implementations, the at least one radially extending protrusion further includes at least one O-ring seals to form an airtight seal between the first opening and the second opening.

In some implementations, the sampler further includes a housing cover position detector, and the housing cover position detector is configured to detect if the housing cover is in the open position or the airtight sealed position.

In some implementations, the housing cover is coupled to the shuttle with a mechanical linkage. In some implementations, the housing cover includes a seal. In some implementations, the seal includes a soft rubber gasket.

In some implementations, the shuttle is biased to the first shuttle position.

In some implementations, the sampler further includes a spring, and the shuttle is biased to the first shuttle position with spring force.

In some implementations, the sample chamber is configured to take samples when the shuttle is in the first shuttle position.

In some implementations, the sample chamber is configured to drain when the shuttle is in the second shuttle position.

In some implementations, the housing cover is coupled to the sample chamber.

Another implementation of the present disclosure is a system for sampling. The system includes a first fluid source including a first fluid, a second fluid source including a second fluid, a housing, housing cover moveable between an open position and a closed position, a sample chamber, an actuator, and a shuttle. The sample chamber has an inlet and an outlet and is disposed within the housing. The housing defines a first opening and a second opening. The shuttle is movably disposed within the housing and coupled to the housing cover and the actuator. The shuttle has a first shuttle position and a second shuttle position. In the first shuttle position, the shuttle fluidly connects the first fluid source with the first opening and with the sample chamber inlet and fluidly connects the second opening with the sample chamber outlet. In the second shuttle position, the shuttle fluidly connects the second fluid source with the second opening and the sample chamber inlet and fluidly connects the first opening with the sample chamber outlet. The actuator is configured to move the shuttle from the first shuttle position to the second shuttle position.

In some implementations, the first fluid is a liquid. In some implementations, the first fluid is sample water. In some implementations, the first fluid is clean water. In some implementations, the first fluid is at ambient pressure.

In some implementations, the closed position of the housing cover is airtight.

In some implementations, the second fluid is a gas. In some implementations, the second fluid is air.

In some implementations, the second fluid is a liquid. In some implementations, the second fluid is sample water. In some implementations, the second fluid is clean water. In some implementations, the second fluid is at a pressure above ambient pressure.

In some implementations, the pressure of the second fluid is approximately 10 psig. In some implementations, in the second shuttle position, the shuttle causes the housing cover to be in the closed position such that the sample chamber can be at the pressure above ambient pressure.

In some implementations, positioning the housing cover from the closed to the open position causes the shuttle to move from the first to the second shuttle position.

In some implementations, the sample chamber inlet includes a vial receptacle. In some implementations, the vial receptacle includes one or more needles. In some implementations, at least a portion of the shuttle is disposed between the first opening and the second opening.

In some implementations, the shuttle includes at least one radially extending protrusion disposed between the first opening and the second opening. In some implementations, the at least one radially extending protrusion further includes at least one o-ring seals to form an airtight seal between the first opening and the second opening.

In some implementations, the system further includes a housing cover position detector, and the housing cover position detector is configured to detect if the housing cover is in the open position or the closed position.

In some implementations, the housing cover is coupled to the shuttle with a mechanical linkage. In some implementations, the housing cover includes a seal. In some implementations, the seal includes a soft rubber gasket.

In some implementations, the shuttle is biased to the first shuttle position. In some implementations, the system further includes a spring, and the shuttle is biased to the first shuttle position with spring force.

In some implementations, the sample chamber is configured to take samples when the shuttle is in the first shuttle position.

In some implementations, the sample chamber is configured to drain when the shuttle is in the second shuttle position.

In some implementations, the housing cover is coupled to the sample chamber.

Yet another implementation of the present disclosure is a reversible flow sampler. The sampler includes a housing, a housing cover moveable between an open position and a closed position, and a shuttle. The housing defines a sample chamber having an inlet and an outlet, a first opening, and a second opening. The shuttle is movably disposed within the housing and coupled to the housing cover. The shuttle has a first shuttle position, a second shuttle position, and an intermediate shuttle position. In the first shuttle position, the shuttle fluidly connects the first opening with the sample chamber inlet and fluidly connects the second opening with the sample chamber outlet. In the second shuttle position, the shuttle fluidly connects the second opening with the sample chamber inlet and fluidly connects the first opening with the sample chamber outlet. In the intermediate shuttle position, the shuttle fluidly connects the first opening with the sample chamber outlet and blocks both the first opening and the second opening from being fluidly connected to the sample chamber inlet.

In some implementations, the lid moving from the closed position to the open position causes the shuttle to move from either the first shuttle position or the second shuttle position to the intermediate shuttle position.

In some implementations, the sampler further includes a metering valve.

In some implementations, the sampler further includes a blocking linkage coupled to the shuttle, the blocking linkage configured to prevent the housing cover from moving from the closed to the open position when the shuttle is in the second shuttle position.

In some implementations, in the first shuttle position, the shuttle is located such that a first fluid enters the first opening and exits the second opening.

In some implementations, the first fluid is a liquid. In some implementations, the first fluid is sample water. In some implementations, the first fluid is clean water.

In some implementations, the first fluid is at a first pressure, and the first pressure is at ambient pressure within the sample chamber.

In some implementations, the sampler further includes a pressure-reducing regulator disposed within the housing, and the first fluid is at a first pressure prior to the sample chamber and the pressure-reducing regulator reduces the first pressure of the first fluid prior to the sample chamber to a predefined level.

In some implementations, the closed position of the housing cover is airtight.

In some implementations, in the second shuttle position, the shuttle is located such that a second fluid enters the second opening and exits the first opening. In some implementations, the second fluid is a gas.

In some implementations, the second fluid is air. In some implementations, the second fluid is a liquid. In some implementations, the second fluid is sample water. In some implementations, the second fluid is clean water.

In some implementations, the second fluid is at a second pressure, and the second pressure is above ambient pressure within the sample chamber.

In some implementations, the second pressure of the second fluid, as it enters the sampler, is approximately 10 psig.

In some implementations, the sampler further includes a pressure-reducing regulator disposed within the housing, the second fluid is at a second pressure prior to the sample chamber, the pressure-reducing regulator reduces the second pressure of the second fluid prior to the sample chamber to a predefined level.

In some implementations, in the second shuttle position, the shuttle causes the housing cover to be in the closed position such that the sample chamber can be at the pressure above ambient pressure.

In some implementations, moving the housing cover from the closed position to the open position causes the shuttle to move from either the first shuttle position or the second shuttle position to the intermediate shuttle position.

In some implementations, the sampler further includes an actuator. In some implementations, the actuator is coupled to the shuttle, and the actuator is configured to move the shuttle from the first shuttle position to the second shuttle position.

In some implementations, the sampler further includes a fluid source, and the shuttle is disposed between the fluid source and the first and second openings.

In some implementations, the sample chamber includes a vial receptacle. In some implementations, the vial receptacle includes one or more needles.

In some implementations, at least a portion of the shuttle is disposed between the first opening and the second opening.

In some implementations, the shuttle includes at least one radially extending protrusion disposed between the first opening and the second opening.

In some implementations, the at least one radially extending protrusion further includes at least one O-ring seals to form an airtight seal between the first opening and the second opening.

In some implementations, the sampler includes a housing cover position detector, and the housing cover position detector is configured to detect if the housing cover is in the open position or the closed position.

In some implementations, the housing cover is coupled to the shuttle with a mechanical linkage. In some implementations, the housing cover includes a seal. In some implementations, the seal includes a soft rubber gasket.

In some implementations, the shuttle is biased to the first shuttle position.

In some implementations, the sampler further includes a spring, and the shuttle is biased to the first shuttle position with spring force.

In some implementations, the sample chamber is configured to take samples when the shuttle is in the first shuttle position.

In some implementations, the sample chamber is configured to drain when the shuttle is in the second shuttle position.

In some implementations, the housing cover is coupled to the sample chamber.

Yet another implementation of the present disclosure is a method using the aforementioned sampler and/or system to take and clear out a sample from the aforementioned sampler and/or system.

Yet another implementation of the present disclosure is a method using the aforementioned sampler and/or system to clear out a sample from the aforementioned sampler and/or system.

Yet another implementation of the present disclosure is a method using the aforementioned sampler and/or system to blow down a sample from the aforementioned sampler and/or system.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF DRAWINGS

Example features and implementations are disclosed in the accompanying drawings. However, the present disclosure is not limited to the precise arrangements and instrumentalities shown.

DETAILED DESCRIPTION

Figure 1:
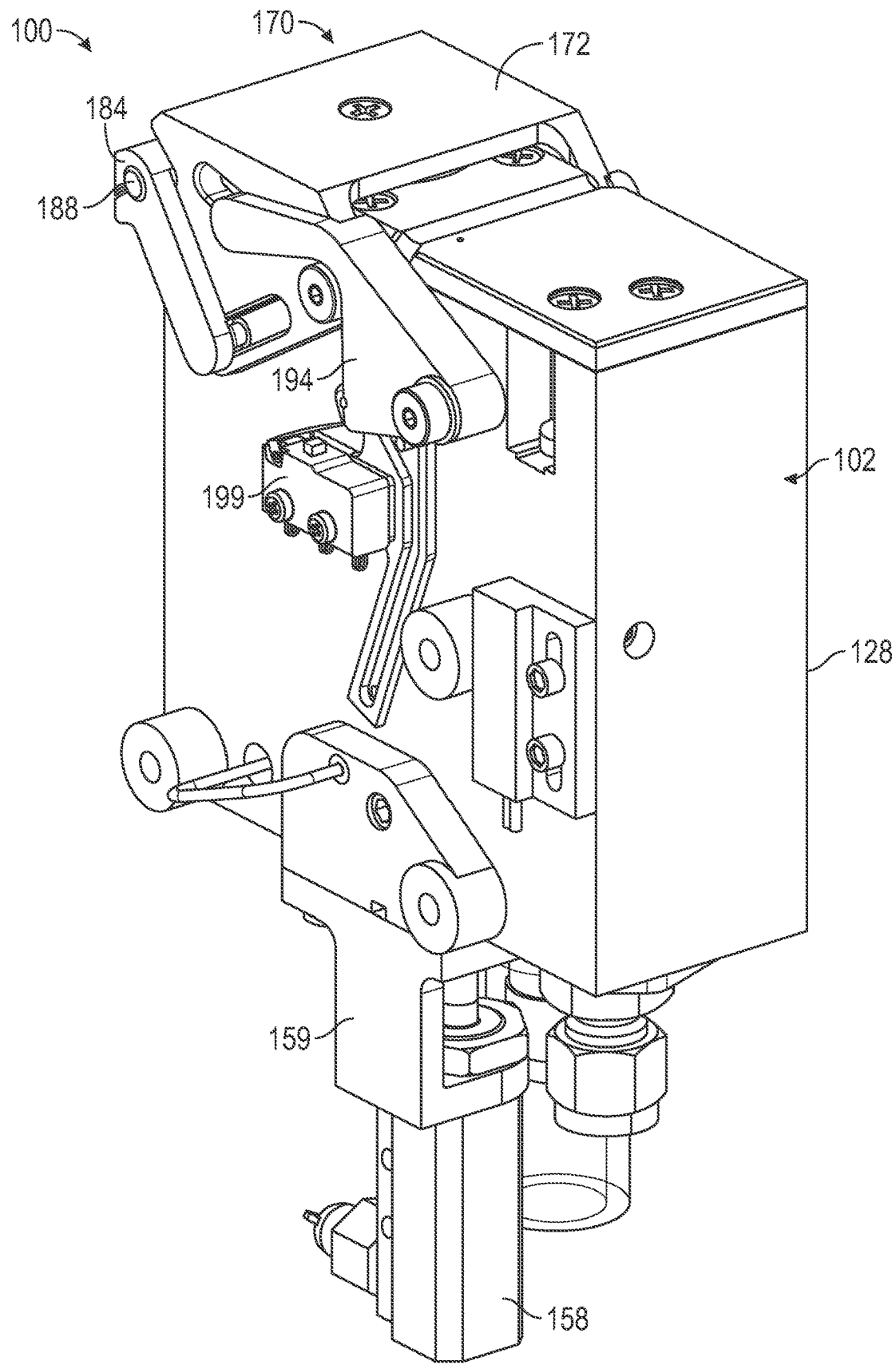
FIG. 1 is a perspective view of a reversible flow sampler, according to one implementation.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

Overview

Disclosed and described herein are embodiments of systems, devices and methods for a reversible flow sampler, and use of the reversible flow sampler to blow down the sample chamber. In some instances, the disclosed reversible flow sampler further uses an active purge mechanism using the same components and functionality to clean the sampling line, which is paramount in pharmaceutical and beverage processes.

The devices, systems, and methods disclosed herein provide for a reversible flow sampler. The reversible flow sampler includes a shuttle that redirects which opening of the sample chamber is the inlet and which is the outlet. When the shuttle is in a first position, the sample chamber is configured to take samples within the sample chamber. When the shuttle is in the second position, the sampler chamber inlet and outlets are reversed, and the sampler is configured to drain out of the sample chamber. Also, when the shuttle is in the second position, pressurized air can be forced into the shuttle chamber to further evacuate all liquid from the sample chamber. In some implementations, the shuttle also has an intermediate position that allows fluid to drain from the sample chamber while blocking all other fluid flow. The reversible flow sampler further includes an airtight sealable lid is mechanically linked to the shuttle such that when the lid is opened, the shuttle can be moved into the second position, thereby allowing any residual fluids in the sample chamber to gravity drain, or the intermediate position, thereby allowing any residual fluids in the sample chamber to drain while blocking all other fluid flow. As the lid is closed, the shuttle returns to the first position.

Reversible Flow Sampler

FIGS. 1-7B illustrate a reversible flow sampler 100 including a housing 102, a shuttle system 130, and a housing cover assembly 170.

The housing 102 defines a shuttle chamber 104 with a shuttle sleeve 105, a shuttle pin slot 109, a sample chamber 112 with a sample chamber opening 114, a fluid source inlet 118, a first opening 120, a second opening 122, a first drain outlet 124, and a second drain outlet 126. The housing 110 also includes an outer surface 128.

The shuttle chamber 104 is defined between the sample chamber 112 and the fluid source inlet 118. The shuttle chamber 104 has longitudinal axis 106, a first end 108, a second end 110 opposite and spaced opposite the first end 108 and a shuttle chamber length extending along the longitudinal axis 106 between the first end 108 and the second end 110 of the shuttle chamber 104.

The shuttle sleeve 105 is a tubular protrusion that extends radially inwardly adjacent the first end 108 of the shuttle chamber 104. The shuttle sleeve 105 includes an O-ring seal 107 to form a seal between the first end 108 of the shuttle chamber 104 and the shuttle body 132, as discussed below.

The shuttle pin slot 109 is defined adjacent the second end 110 of the shuttle chamber 104, extends from the shuttle chamber 104 to the outer surface 128 of the housing 102, and is configured to receive a shuttle pin 154, as further described below.

The shuttle chamber 104, sample chamber 112, and the fluid source inlet 118 are all in fluid communication. The shuttle chamber 104 is specifically in fluid communication with the sample chamber 112 through the first opening 120 and the second opening 122. The first opening 120 extends from the shuttle chamber 104 to the sample chamber 112 at about a 5 degree angle relative to the longitudinal axis 106 of the shuttle chamber 104, and the second opening 122 extends from the shuttle chamber 104 to the sample chamber 112 at an upward angle (e.g., 45 degree angle) also relative to the longitudinal axis 106 of the shuttle chamber 104. In other implementations, the first opening and the second opening extend from the shuttle chamber to the sample chamber at any angle between 0 and 90 degrees.

The first opening 120 is spaced apart from the second opening 122 along the longitudinal axis 106 of the shuttle chamber 104 such that the first opening 120 is defined closer than the second opening 122 to the first end 108 of the shuttle chamber 104.

Depending on the position of the shuttle system 130 within the shuttle chamber 104, as described in more detail below, the first opening 120 is in fluid communication with the first drain outlet 124 or the second opening 122 is in fluid communication with the second drain outlet 126. Also, the housing 102 further includes a weir. The weir is disposed adjacent the second drain outlet 126 such that at least a portion of the second opening 122 is closer than the weir to the second end 110 of the shuttle chamber 104. In other implementations, the weir is disposed below the second opening and between the second opening and the second drain outlet. In other implementations, the housing defines one drain outlet or multiple drain outlets in fluid communication with the first opening and/or the second opening.

The sample chamber 112 includes the sample chamber opening 114 and is configured to take samples and includes a vial receptable 115 with two needles 116. At least a portion of the outer surface 128 of the housing 102 adjacent the sample chamber opening includes a raised lip 129. One of needles 116 is configured to act as vent for the sample chamber 112, and the other needle 116 pulls the sample into an analyzer (not shown). While the sample chamber 112 shown in FIGS. 3 and 4 includes two needles 116, in other implementations, the vial receptacle comprises one, three, four, or more needles. The sample chamber 112 switches from the first opening 120 being the inlet and the second opening 122 being the outlet to the second opening 122 being the inlet and the first opening 120 being the outlet, depending on the position of the shuttle system 130, as described in detail below.

Figure 2:
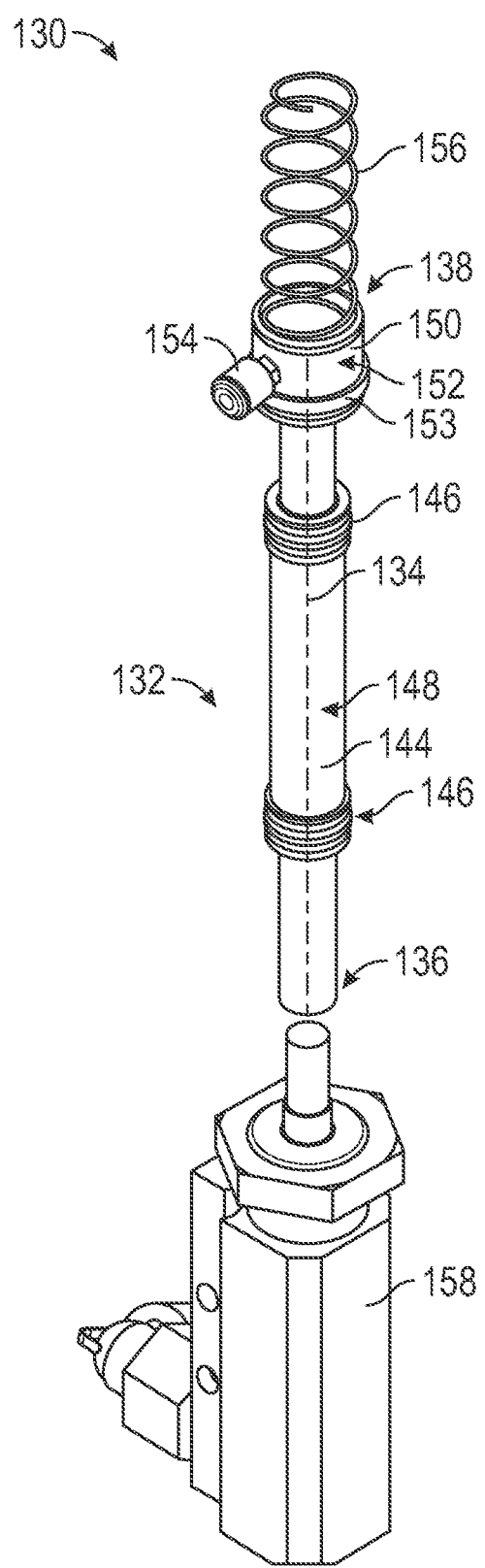
FIG. 2 is a perspective view of a shuttle system of the reversible flow sample of FIG. 1, according to one implementation.

The shuttle system 130 includes a shuttle body 132, a spring 156, and an actuator 158. The shuttle system 130 is illustrated in FIG. 2.

The shuttle body 132 is cylindrical with a longitudinal axis 134, a first end 136, a second end 138 opposite and spaced apart from the first end 136, and a shuttle body length extending along the longitudinal axis 134 from the first end 136 to the second end 138 of the shuttle body 132. Although the shuttle body 132 shown in FIG. 2 is solid, in other implementations, the shuttle body is hollow.

The shuttle body 132 is disposed within the shuttle chamber 104 such that the longitudinal axis 134 of the shuttle body 132 and the longitudinal axis 106 of the shuttle chamber 104 are aligned and such that the shuttle body 132 is disposed between the fluid source inlet 118 and the first and second openings 120, 122. The first end 136 of the shuttle body 132 is further slidably disposed within the shuttle body sleeve 105 such that the shuttle sleeve 105 is adjacent the first end 136 of the shuttle body 132. The shuttle body length is less than the shuttle chamber length by about ¼ of an inch such that the shuttle body 132 is movably disposable within the shuttle chamber 104 along the longitudinal axis 106 of the shuttle chamber 104. In other implementations, the shuttle body length is less than the shuttle chamber length by ½ an inch, 1 inch, or any amount greater than 1 inch.

The shuttle body 132 further includes a first radial protrusion 144 and a second radial protrusion 150 that extend radially outwardly from the outer surface of the shuttle body 132. In other implementations, the shuttle body includes one, three, four, five, or any number of radially extending protrusions.

The first radial protrusion 144 is disposed between the first end 136 and the second end 138 of the shuttle body 132, and the second radial protrusion 150 is adjacent the second end 138 of the shuttle body 132.

The first radial protrusion 144 includes two O-ring seals 146 and an outer surface 148. The outer surface 148 of the first radial protrusion 144 extends longitudinally between the two O-ring seals 146. One of the two O-ring seals 146 of the first radial protrusion 144 is disposed between the first opening 120 and the second opening 122 regardless of the position of the shuttle body 132. In FIGS. 1-7B, one of the two O-ring seals 146 of the first radial protrusion 144 creates an airtight seal between the first opening 120 and the second opening 122 regardless of the position of the shuttle body 132, but in other implementations, at least a portion of the first radial protrusion creates an airtight seal between the first opening and the second opening again regardless of the position of the shuttle body. Also in other implementations, the O-ring seals have a round, square, rectangular, cross, star, or any other closed cross sectional shape.

The second radial protrusion 150 includes an outer surface 152 and an O-ring seal 153. The O-ring seal 153 helps direct water over the weir disposed adjacent the second drain outlet 126 and prevents fluid from rising upwards and out of the shuttle chamber 104. The outer surface 152 of the second radial protrusion 150 includes the shuttle pin 154 extending outwardly perpendicularly from the outer surface 152 of the second radial protrusion 150.

The spring 156 is disposed between the second end 138 of the shuttle body 132 and the second end 110 of the shuttle chamber 104 such that the spring 156 is coaxial with the longitudinal axes 134, 106 of the shuttle body 132 and the shuttle chamber 104. The spring 156 biases the shuttle body 132 towards the first end 108 of the shuttle chamber 104.

Figure 3:
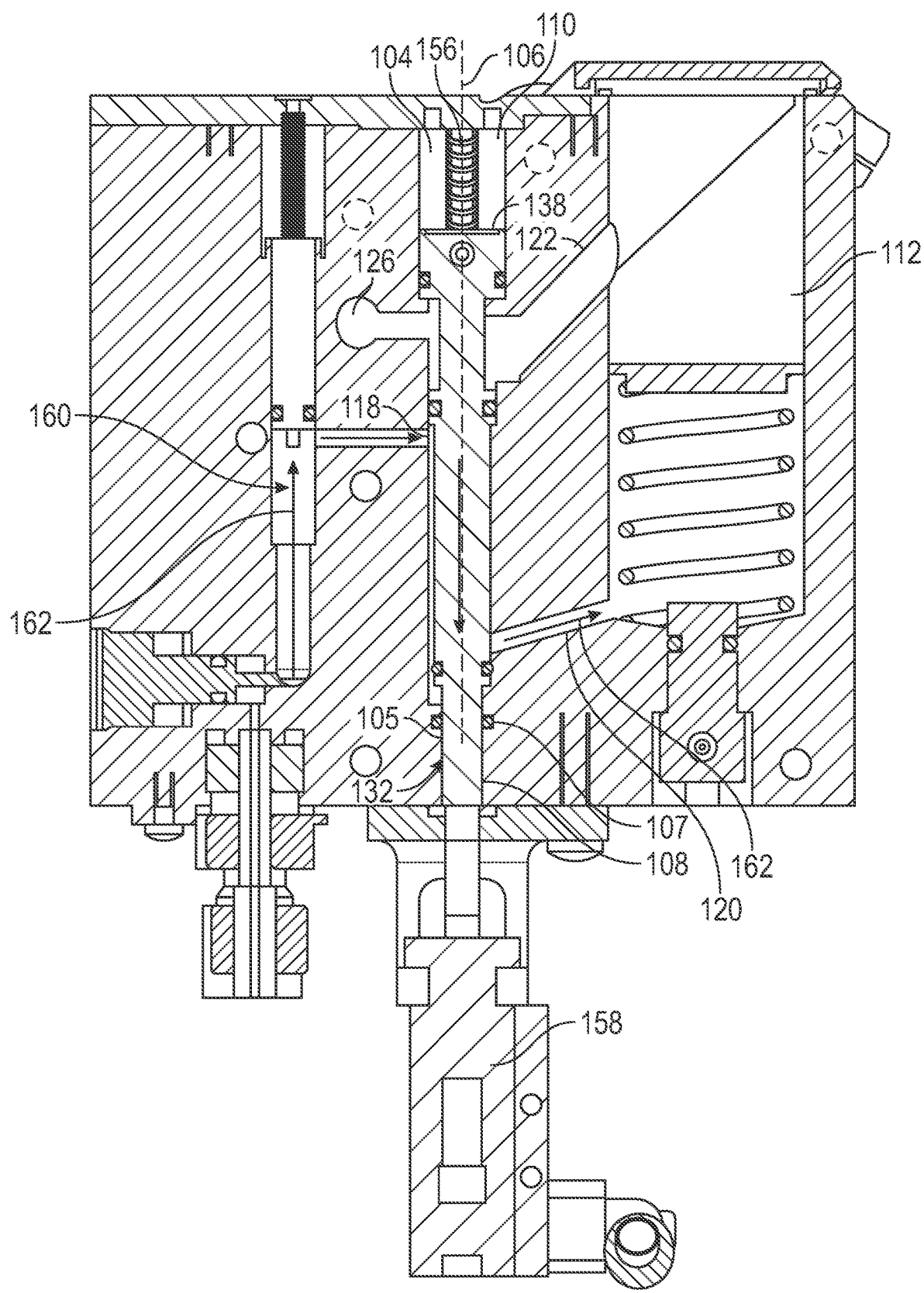
FIG. 3 is a cross section of the reversible flow sampler of FIG. 1 in a first shuttle position.
Figure 4:
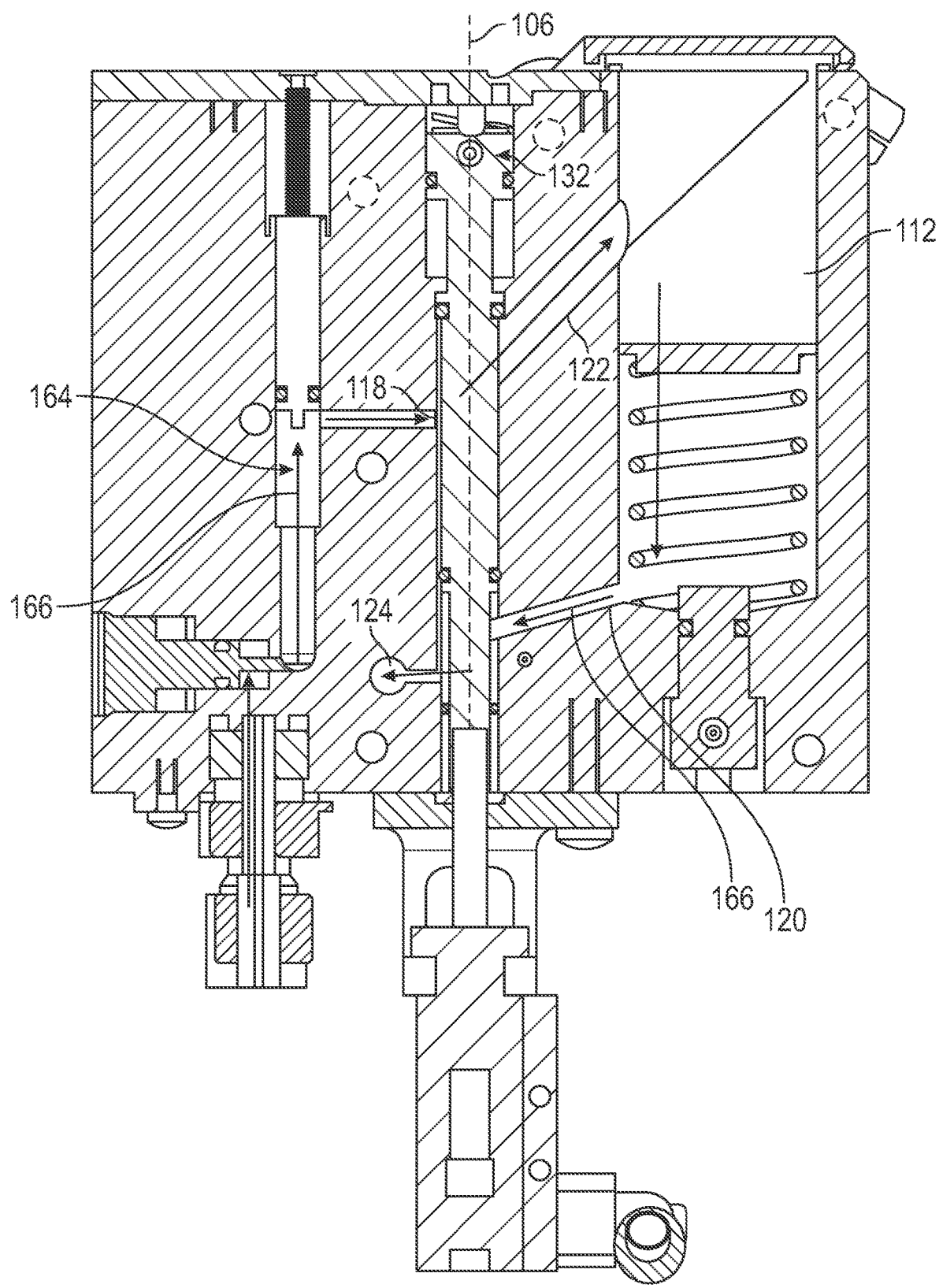
FIG. 4 is a cross section of the reversible flow sampler of FIG. 1 in a second shuttle position.

The actuator 158 is spaced away from the first end 136 of the shuttle body 132 and fixedly coupled to the housing 102 by means of a bracket 159 as shown in FIG. 1. In other implementations, the actuator is fixedly coupled to the housing through mechanical fasteners, adhesives, or any other coupling method capable of fixedly coupling the actuator and the housing. The actuator 158 extends into the shuttle chamber such that the actuator 158 pushes the shuttle body 132 from a first shuttle position, as shown in FIG. 3, to a second shuttle position, as shown in FIG. 4. The amount of force the actuator 158 uses to push the shuttle body 132 from the first position to the second position exceeds the biasing force of the spring 156 in addition to the friction of the O-ring seals 107, 148, and 153. When the actuator 158 is not actuated, there can be a gap of about 1-4 mm between the actuator and the shuttle body 132. In FIGS. 1-7B, the actuator comprises a pneumatic piston, but in other implementations, the actuator includes a solenoid, an electrical actuator, or any actuator capable of moving the shuttle body from a first shuttle position to a second shuttle position.

In the first shuttle position, as shown in FIG. 3, the sample chamber 112 is configured to take samples, the fluid source inlet 118 includes a first fluid 160, and the shuttle body 132 is positioned such that the first fluid 160 travels a first fluid path 162. In the first fluid path 162, the fluid source inlet 118 fluidly connects to the first opening 120 such that the first fluid 160 travels from the fluid source inlet 118 over the outer surface 148 of the first radial protrusion 144 to the first opening 120. The first opening 120 is the sample chamber inlet, and the second opening 122 is the sample chamber outlet. The second opening 122 is also in fluid communication with the second drain outlet 126. The first fluid 160 shown along the first fluid path 162 in FIG. 3 is sample water. The shuttle body 132 is also biased to the first shuttle position by the spring 156.

While the first fluid in FIG. 3 is sample water, in other implementations, the first fluid is clean water or any liquid.

The actuator 158 linearly pushes the shuttle body 132 along the longitudinal axis 106 of the shuttle chamber 104 towards the second end 110 of the shuttle chamber 104 to the second shuttle position as shown in FIG. 4. In the second shuttle position, the sample chamber 112 is configured to drain, the fluid source inlet 118 includes a second fluid 164, and the shuttle body 132 is positioned such that the second fluid 164 travels a second fluid path 166 as shown in FIG. 4. In the second fluid path 166, the fluid source inlet 118 fluidly connects to the second opening 122 such that the second fluid 164 travels from the fluid source inlet 118 over the outer surface 148 of the first radial protrusion 144 to the second opening 122. The second opening 122 is the sample chamber inlet, and the first opening 120 is the sample chamber outlet. The first opening 120 is also in fluid communication with the first drain outlet 124. The second fluid 164 shown along the second fluid path 166 in FIG. 4 is air and enters the second fluid path at a pressure of approximately 10 psig.

While the second fluid 164 shown in FIG. 4 is air, in other implementations, the second fluid is any gas or any liquid such as sample water or clean water. In other implementations, the pressure of the second fluid is any pressure above ambient pressure.

To ensure that the pressurized air does not escape through the sample chamber opening 114 instead of the first drain outlet 124, the housing cover assembly 170 is airtight when the second fluid path 166 is implemented. Although, in other implementations, the housing cover assembly is not fully airtight, and the housing cover assembly seals sufficiently for gasses, typically air, to push fluids in sample chamber through second fluid path.

The housing cover assembly 170 includes a lid 172, two first lever arms 184, a second lever arm 194, and a housing cover position detector 199. The housing cover assembly 170 is pivotably coupled to the housing 102 and the shuttle body 132 such that the housing cover assembly 170 is movable between an open position and a closed position. In some implementations, the closed position is airtight.

Specifically, the lid 172 of the housing cover assembly 170 is coupled to the shuttle body 132 through multiple pin-and-slot mechanical linkages between the lid 172, the two first lever arms 176, the second lever arm 194, and the shuttle pin 154.

Figure 5:
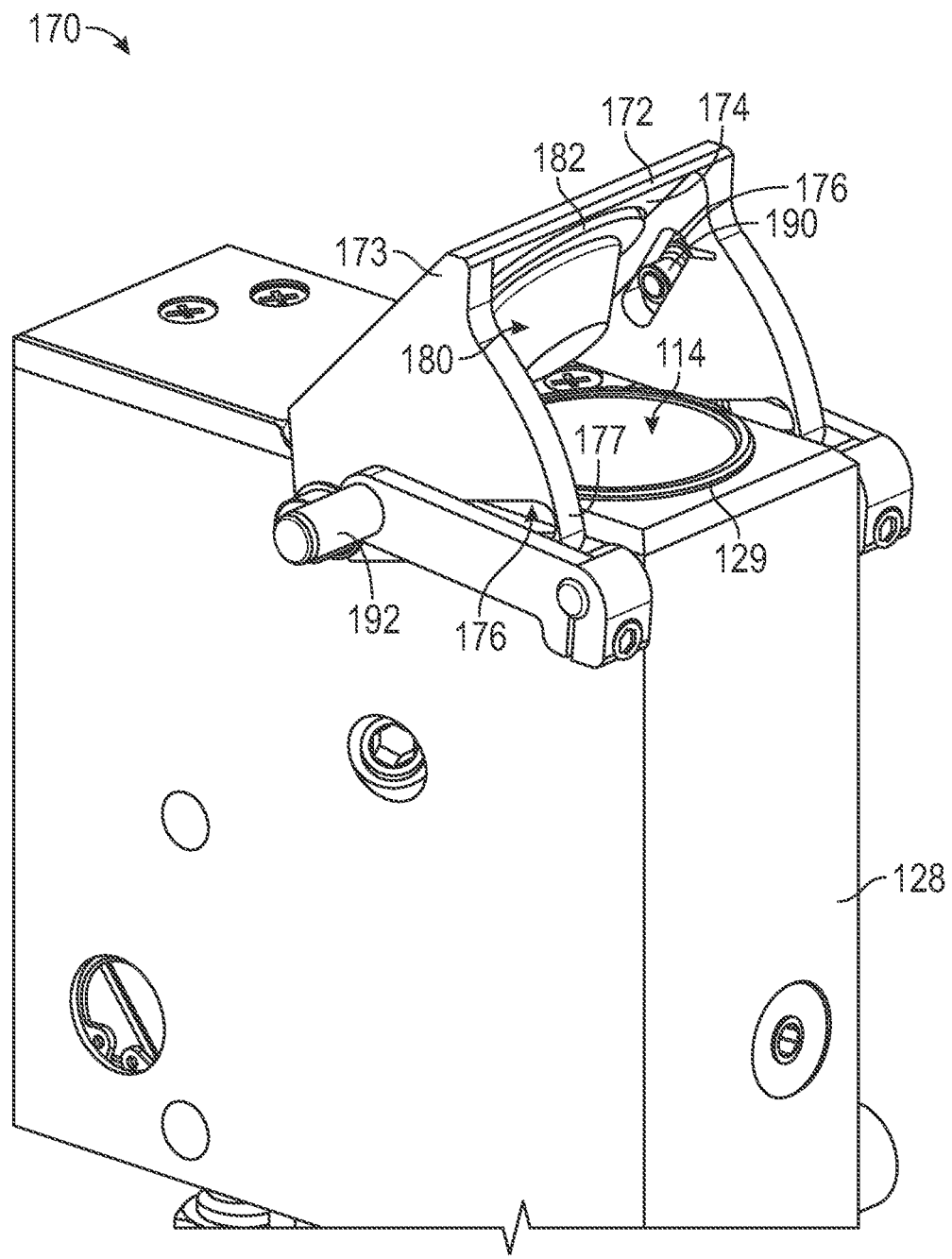
FIG. 5 is a perspective view of the reversible flow sampler of FIG. 1 with a lid of the reversible flow sampler in an open position.

The lid 172 has an outer surface 173 and an inner surface 174 and defines two first lever arm slots 176 spaced opposite and apart from each other and a second lever arm slot 178. One of the first lever arm slots 176 includes a small recess 177 at one end of both of the first lever arm slots 176 with a depth of about 0.005" deep. In other implementations, one end of one of the first lever arm slots includes a small recess or neither of the first lever arm slots include small recesses. In other implementations, the recess has a depth of about 0.0025" to about 0.01". The inner surface 174 of the lid 172 includes a lid protrusion 180 and a seal 182 that extends adjacent the lid protrusion 180 as shown in FIG. 5. The seal 182 includes a soft rubber gasket. The lid 172 is configured to be removably disposable over the sample chamber opening 114 and the raised lip 129 surrounding the sample chamber opening 114.

The two first lever arms 184 each include a first end 185 and a second end 186 spaced opposite and apart from the first end 185. Each of the first ends 185 of the two first lever arms 184 are pivotably attached to the housing 102 and fixedly attached to each other through a first lever arm connector 188. Each of the second ends 186 of the two first lever arms 184 include first lever arm pins 190 that are movably disposed within the two first lever arm slots 176 defined by the lid 172. Also, at least one of the first lever arms 184 includes a handle 192 fixedly attached to the at least one of the first lever arms 184. In other implementations, both of the first lever arms include a handle or neither of the first lever arms include a handle.

The second lever arm 194 is pivotably attached to the housing 102, includes a second lever arm pin 196, and defines a second lever arm recess 198. The second lever arm pin 196 is disposed within the second lever arm slot 178 defined by the lid 172. The shuttle pin 154 is movably disposed within the shuttle pin slot 109 and the second lever arm recess 198 such that the shuttle body 132 and housing cover assembly 170 are mechanically linked through the shuttle pin 154.

The housing cover position detector 199 is attached to a portion of the outer surface 128 of the housing 102 adjacent the second lever arm 194 and is configured to detect the position of the lid 192 indirectly through the second lever arm 194. In the sampler 100 shown in FIGS. 1-7B, the housing cover position detector 199 is a limit switch. In other implementations, the housing cover position detector is an infrared position sensor or any other type of position sensor. In further implementations, the housing cover position detector is placed adjacent the lid, adjacent the first lever arms, or any location where the housing cover position detector is able to detect the position of the lid.

Figure 6A:
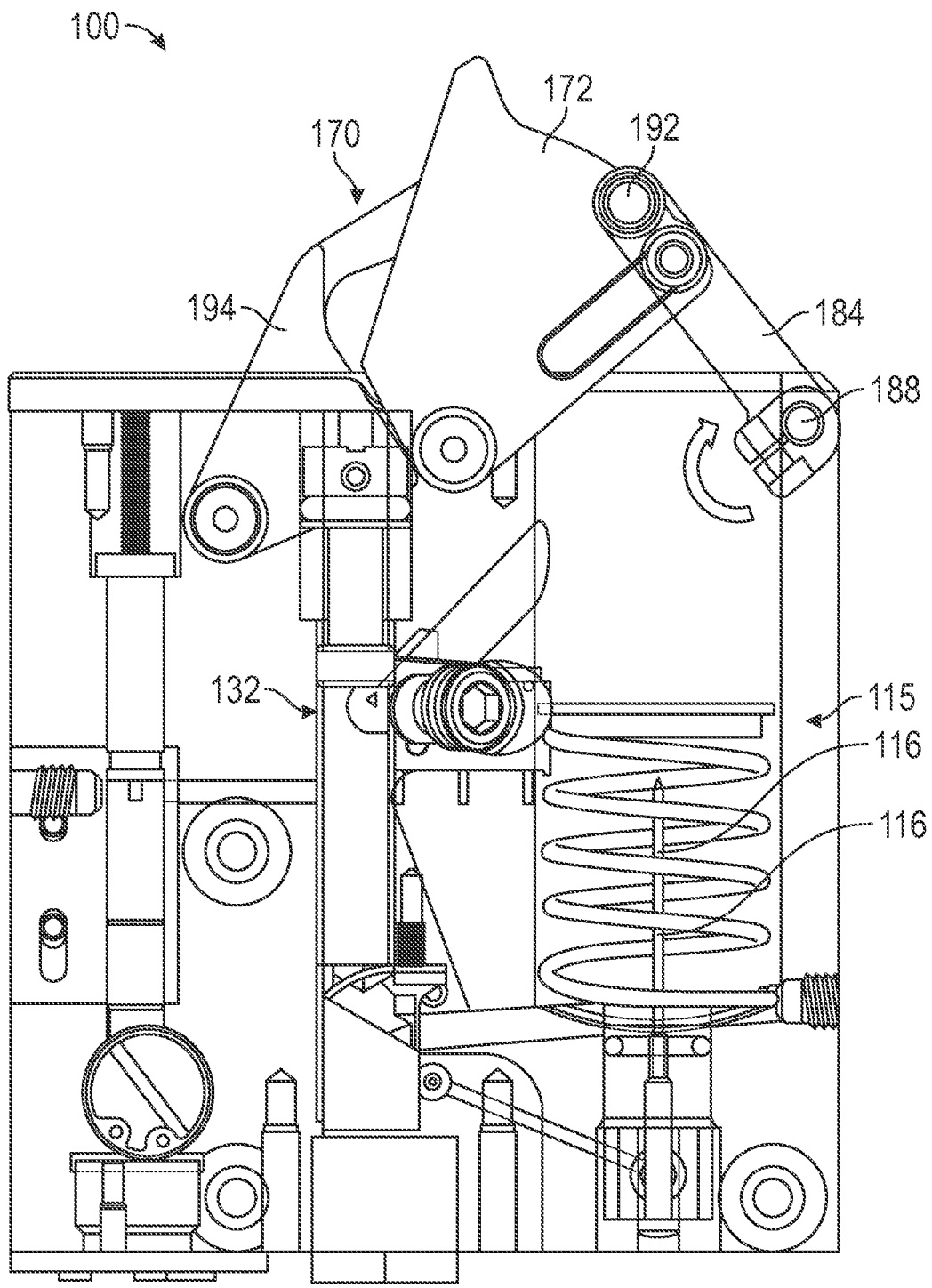
FIG. 6A is a side view of the reversible flow sampler of FIG. 1 with the lid of the reversible flow sampler in an open position.
Figure 6B:
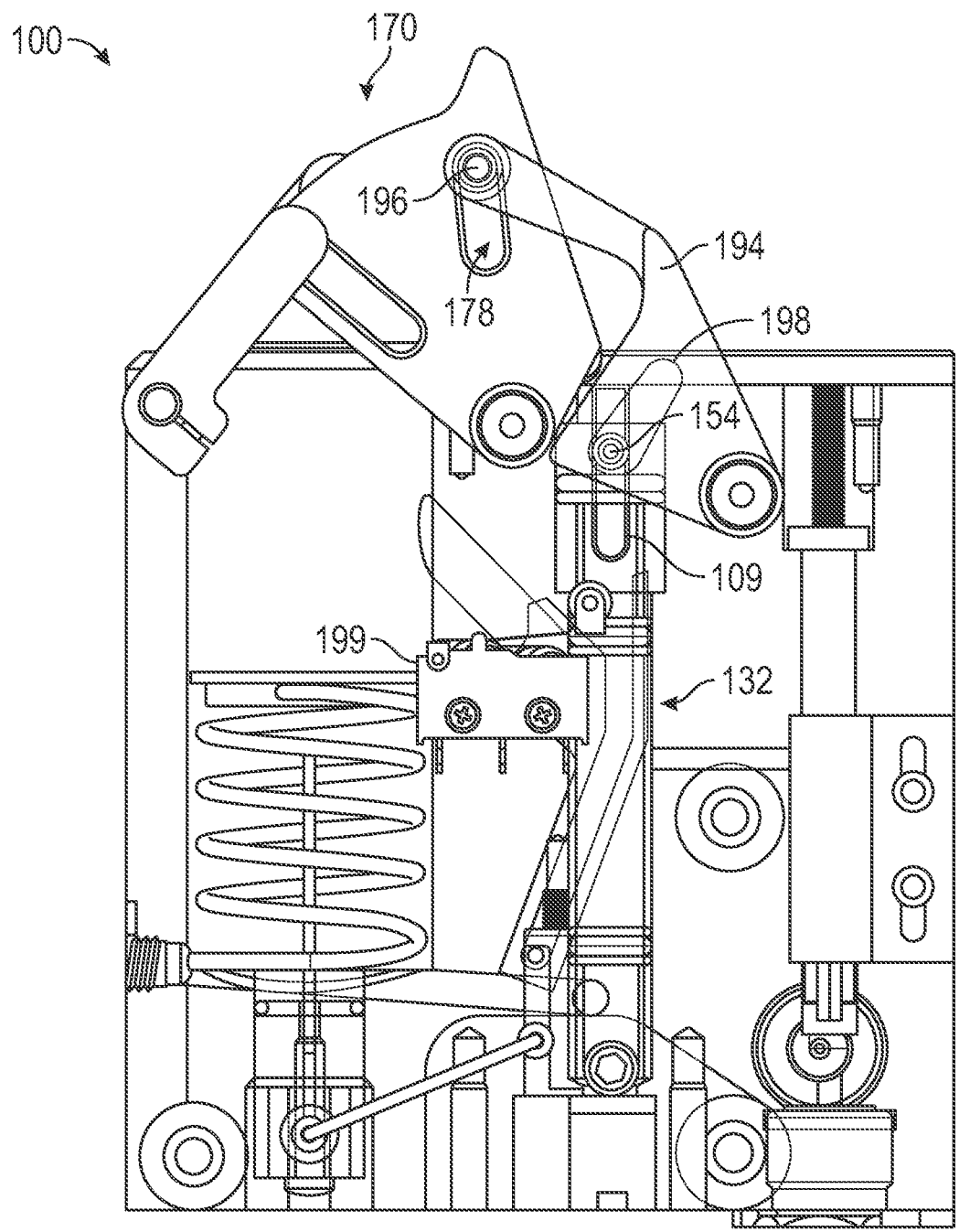
FIG. 6B is another side view of the reversible flow sampler of FIG. 1 with the lid of the reversible flow sampler in an open position.

The lid 172 is opened and closed through rotation of the handle 192. When the handle 192 is rotated clockwise as shown in FIGS. 6A and 6B, the housing cover assembly 170 moves to the open position. The rotation of the handle 192 causes the first lever arm pins 190 to move within the first lever arm slots 176 and lift the lid 172 which causes the second lever arm pin 196 to move within the second lever arm slot 178 which rotates the second lever arm 194 counterclockwise as shown in FIG. 6A When the second lever arm 194 rotates counterclockwise as shown in FIG. 6A, the shuttle pin 154 is moved within the shuttle pin slot 109 toward the second end 110 of the shuttle chamber 104 positioning the shuttle body 132 in the second shuttle position.

Figure 7A:
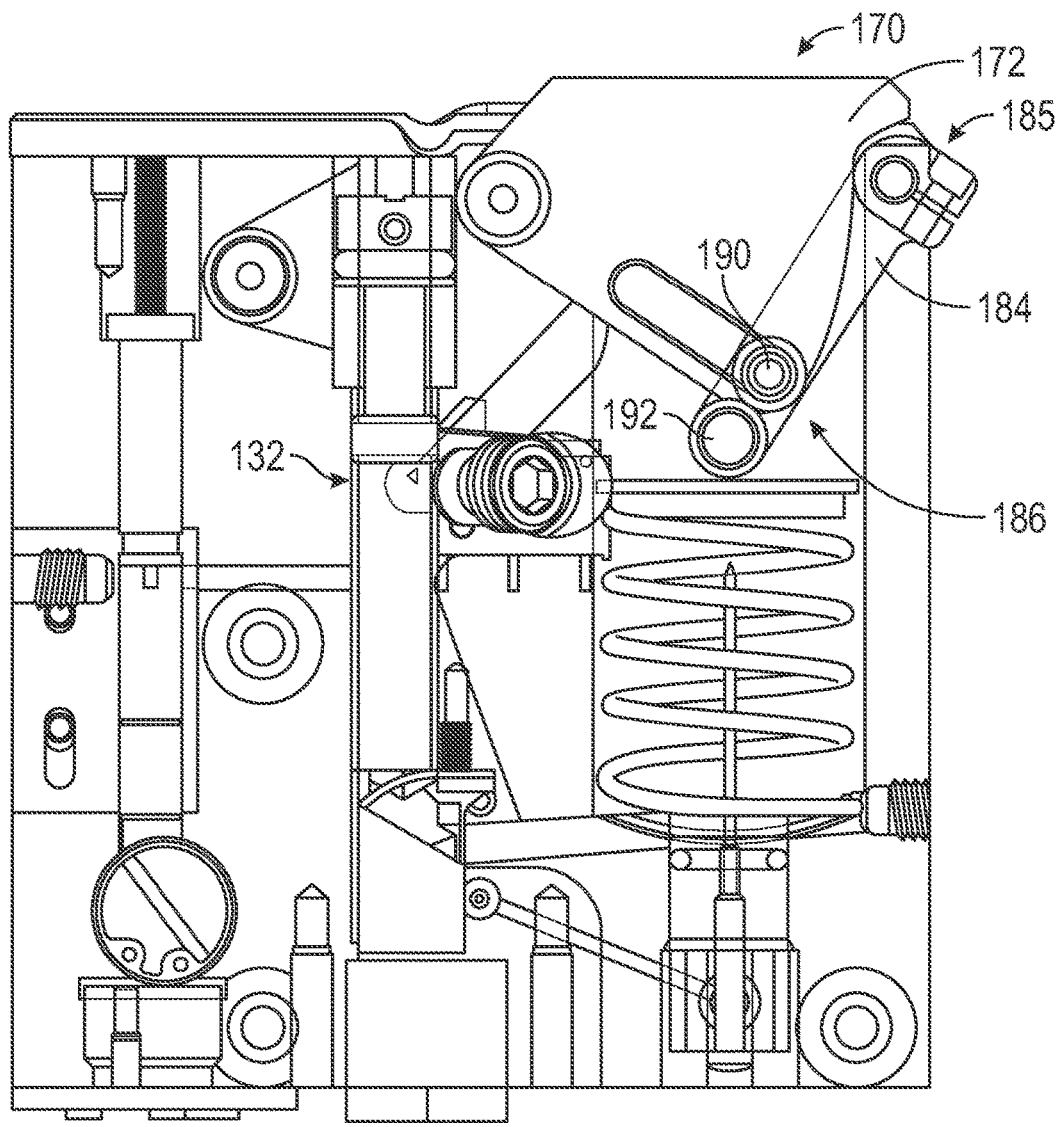
FIG. 7A is a side view of the reversible flow sampler of FIG. 1 with the lid of the reversible flow sampler in a closed position.
Figure 7B:
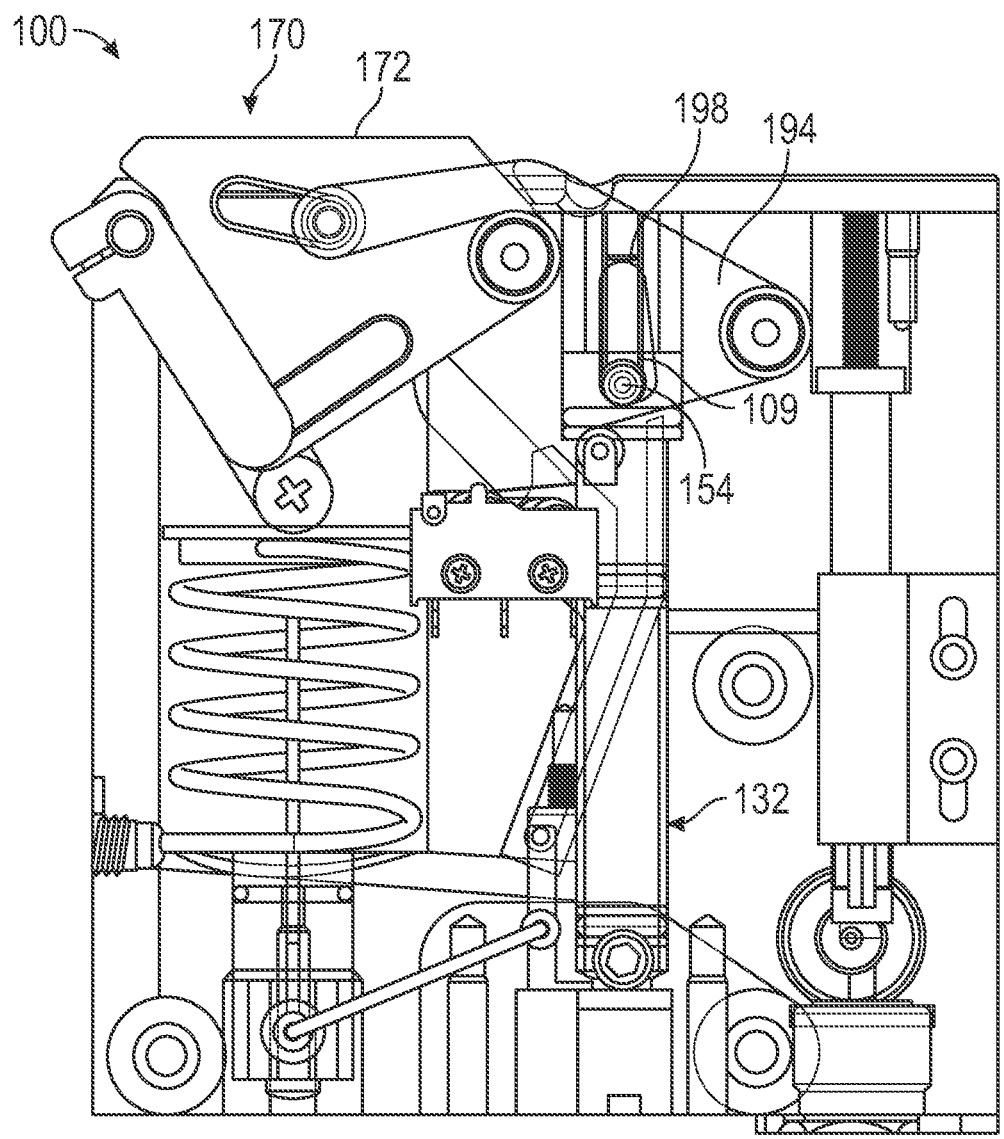
FIG. 7B is another side view of the reversible flow sampler of FIG. 1 with the lid of the reversible flow sampler in a closed position.

When the handle 192 is rotated counterclockwise, the housing cover assembly 170 moves to the closed position as shown in FIGS. 7A and 7B. The rotation of the handle 192 causes the first lever arm pins 190 to move within the first lever arm slots 176 and close the lid 172 which causes the second lever arm pin 196 to move within the second lever arm slot 178 which rotates the second lever arm 194 clockwise towards the housing 102 as shown in FIG. 7A. When the second lever arm 194 rotates clockwise towards the housing 102 as shown in FIG. 7A, the spring 156 forces the shuttle pin 154 down the shuttle pin slot 198 towards the first end 108 of the shuttle chamber 104 positioning the shuttle body 132 in the first shuttle position. When the lid 172 is fully in the closed position, the second lever arm 194 triggers the housing cover position detector 199. The housing cover position detector 199 is in electrical communication with an analyzer or other logic controllers. Also, when the housing cover assembly 170 is in the closed position as shown in FIG. 7B, the shape of the second lever arm recess 198 and the shuttle pin slot 109 allows the shuttle pin 154 to move longitudinally relative to the longitudinal axis 106 of the sample chamber 104 such that the shuttle body 132 is able to move between the first shuttle position and the second shuttle position.

In some implementations, the housing cover assembly is coupled to the shuttle body such that when the actuator moves the shuttle body to the second shuttle body position, the shuttle body forces the housing cover assembly into the closed position. In some implementations, the housing cover assembly is coupled to the shuttle body such that when the spring forces the shuttle body from the second shuttle position to the first shuttle position, the shuttle body forces the housing cover assembly into the open position. In other implementations the housing cover assembly is not coupled to the shuttle body. In another implementation, the actuator is energized through an external logic controller in electrical communication with a cover position detector, and the position of the shuttle body is electronically coupled to the position of the lid.

As the lid 172 moves to the airtight or closed position, the angle between the two first lever arms 184 and the first lever arm slots 176 approaches 90 degrees such that there is an increasingly high mechanical advantage as the soft rubber gasket of the seal 182 is compressed against the sample chamber opening 114 and the raised lip 129. When the first lever arm slots 176 reach 90 degrees, the first lever arm pins 190 drop into the small recess 177 of first lever arm slots 176. By dropping into the small recess 177, the first lever arms lightly locks in place. The first lever arms locking in place locks the lid in place and prevents the housing cover assembly from inadvertently opening. In other implementations, the housing cover assembly is slidably attached, latched, suctioned onto the housing, or any combination thereof. Additionally, in other implementations, the housing cover assembly is attached through a four-bar linkage or multi-bar linkage assembly.

Figure 8A:
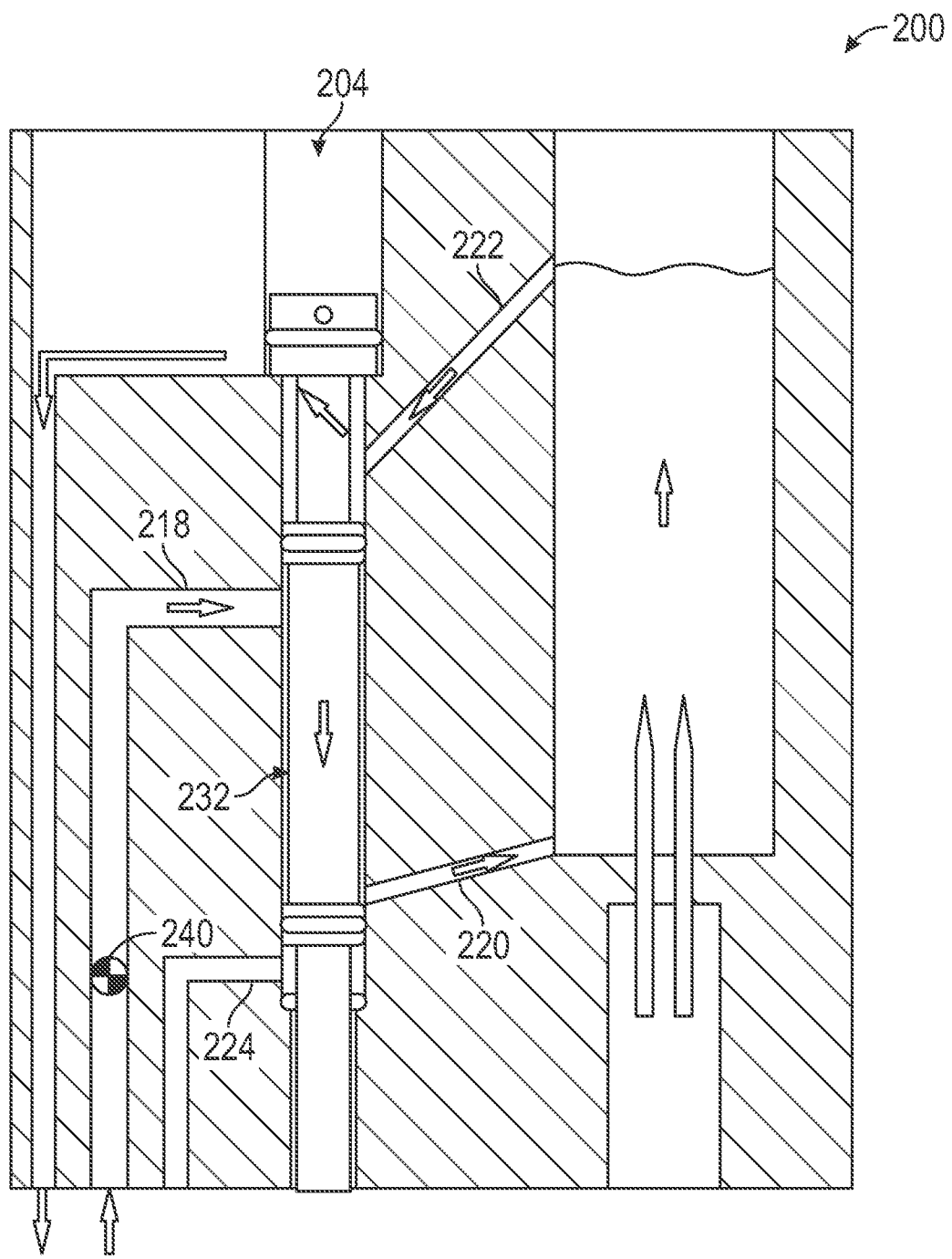
FIG. 8A is a schematic of another implementation of the reversible flow sampler in a first shuttle position.
Figure 8B:
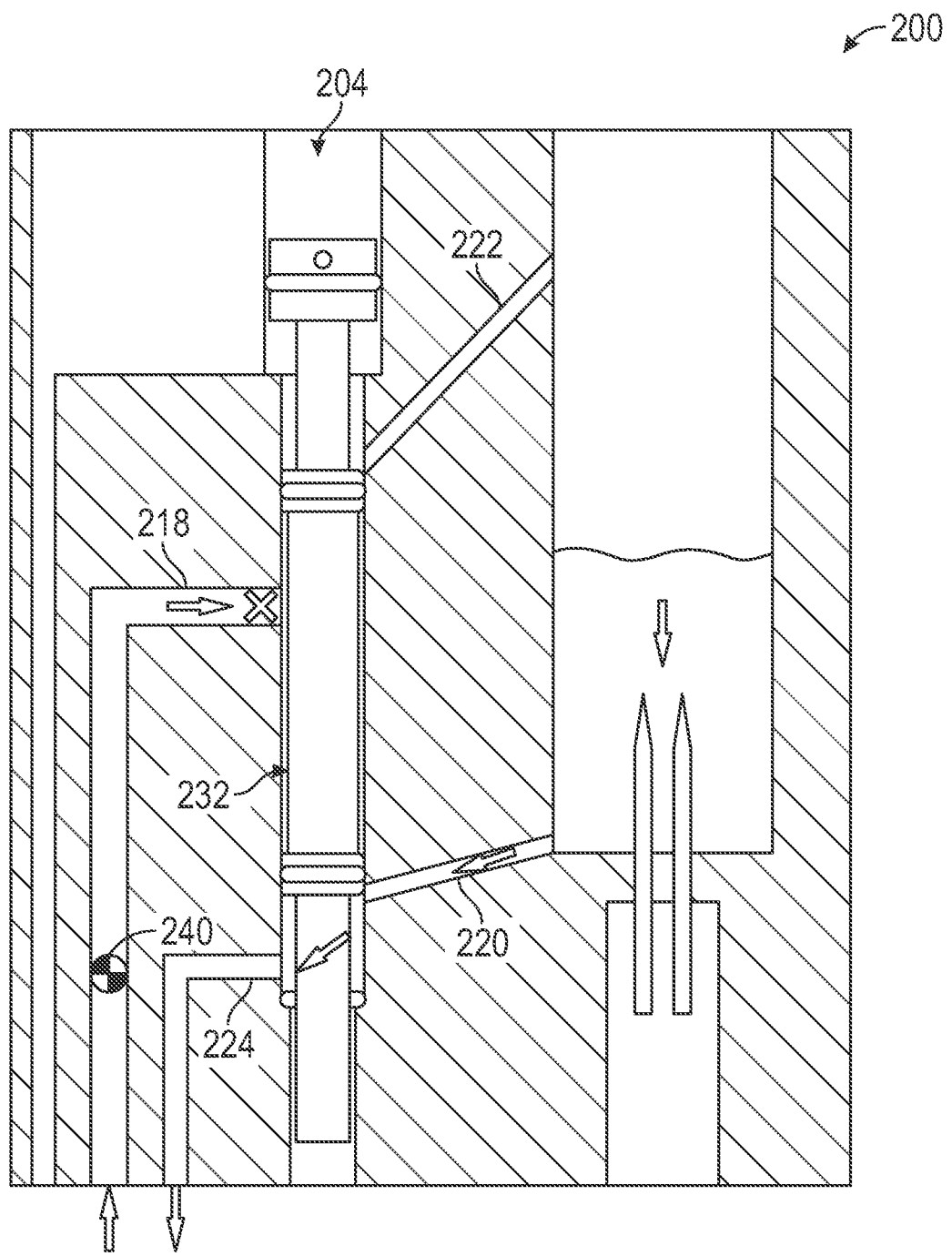
FIG. 8B is a schematic of the implementation of the reversible flow sampler of FIG. 8A in an intermediate shuttle position.
Figure 8C:
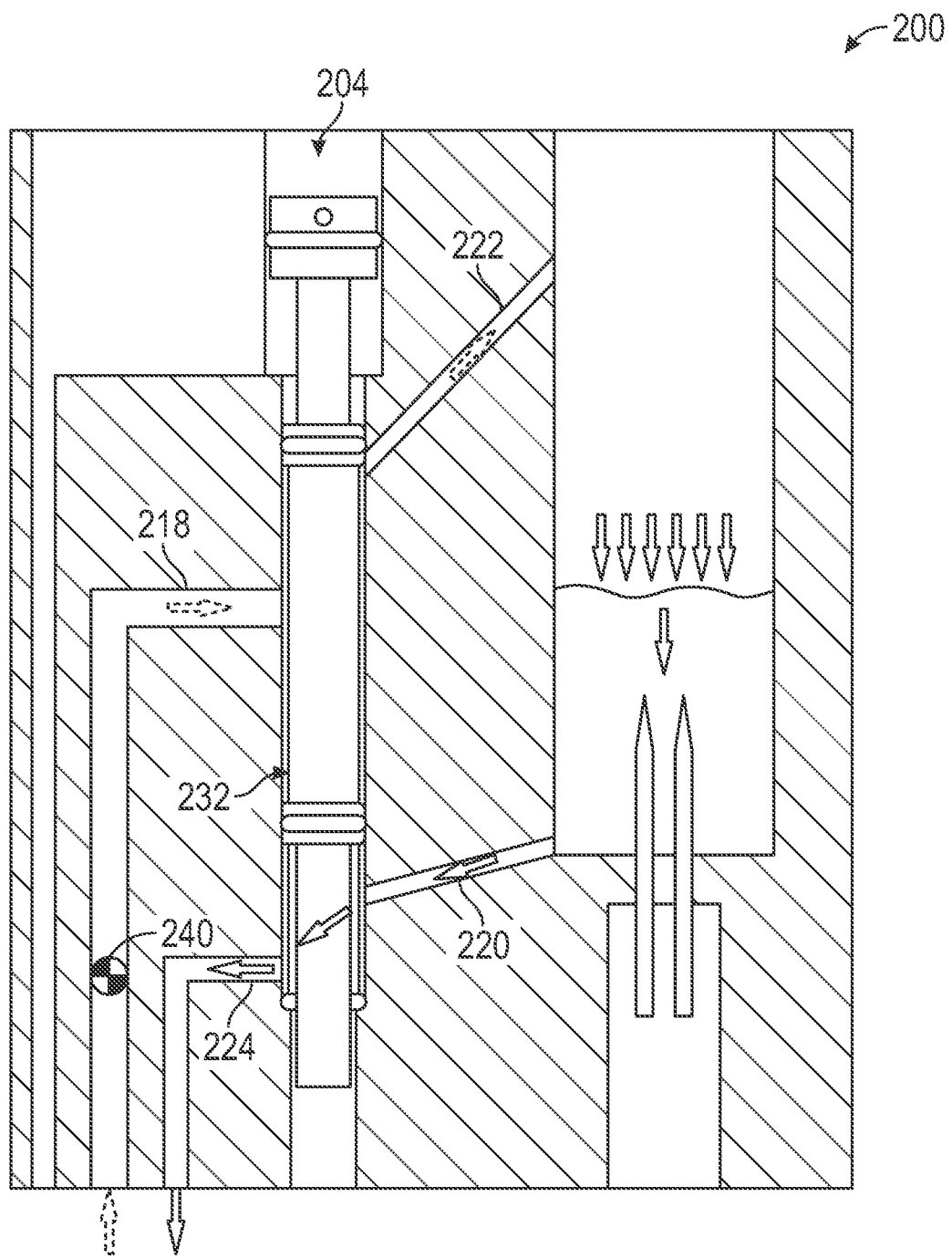
FIG. 8C is a schematic of the implementation of the reversible flow sampler of FIG. 8A in a second shuttle position.

In another implementation and as shown in FIGS. 8A-8C, a sampler 200 includes similar structures and features to sampler 100 described above, the differences will be discussed in more detail below, like element numbers will be used to identify like elements. The shuttle body 232 is movable between a first shuttle position as shown in FIG. 8A, an intermediate shuttle position as shown in FIG. 8B, and a second shuttle position as shown in FIG. 8C. The first shuttle position and the second shuttle position of the shuttle body 232 are substantially similar to the first shuttle position and second shuttle position of shuttle body 132. In the intermediate position, the shuttle body 232 is disposed within the shuttle chamber 204 such that the fluid source inlet 218 is fluidly blocked from the first opening 220 and the second opening 222. Also, in the intermediate position, the first opening 220 is in fluid communication with the first drain outlet 224. The shuttle body 232 is moved into the intermediate position by a button, switch, slider, or any other control/actuation device. In some implementations, the shuttle body includes a radially extending protrusion or another O-ring or any component capable of blocking the fluid source from being in fluid communication with the first opening and the second opening.

The sampler 200 shown in FIGS. 8A-8C further includes a pressure-reducing regulator 240. The pressure reducing regulator 240 is disposed within the fluid source inlet 218 prior to the shuttle chamber 204 such that the pressure of the fluid is reduced to a predefined level by the pressure-reducing regulator 240 prior to entering the shuttle chamber 204. In the implementation shown in FIGS. 8A-8C, the predefined level is about 10 psi, but in other implementations, the predefined level is any pressure that allows for accurate sample reading and normalization of the pressure of the fluid to the pressure of the sample chamber such that the sampler valve timing for each sequence will be the same regardless of the inlet pressure or source. In other implementations, the sampler further includes a metering valve disposed within the fluid source inlet prior to the shuttle chamber in addition to the pressure reducing regulator or replacing the pressure reducing regulator.

Figure 9A:
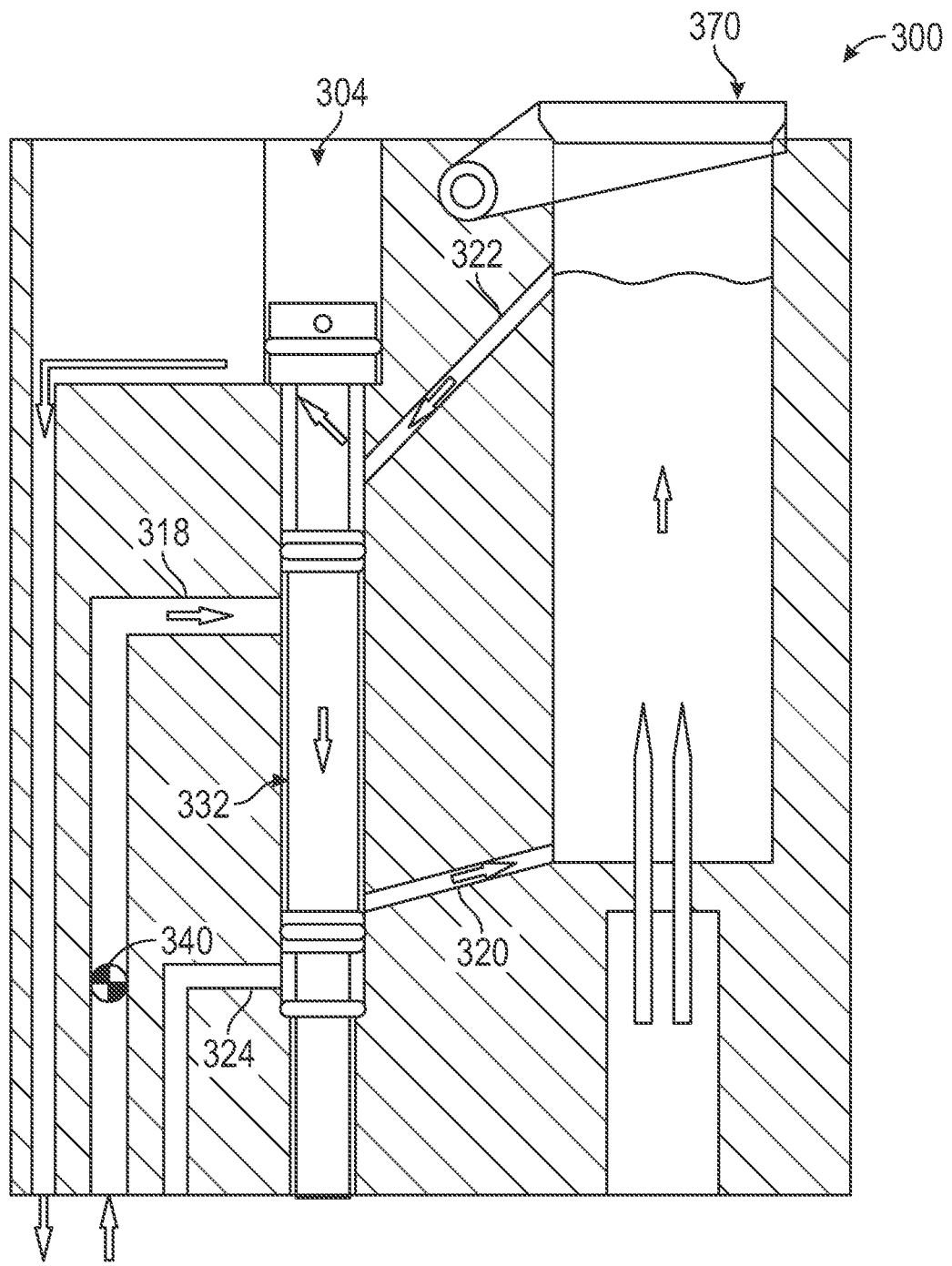
FIG. 9A is a schematic of another implementation of the reversible flow sampler in a first shuttle position.
Figure 9B:
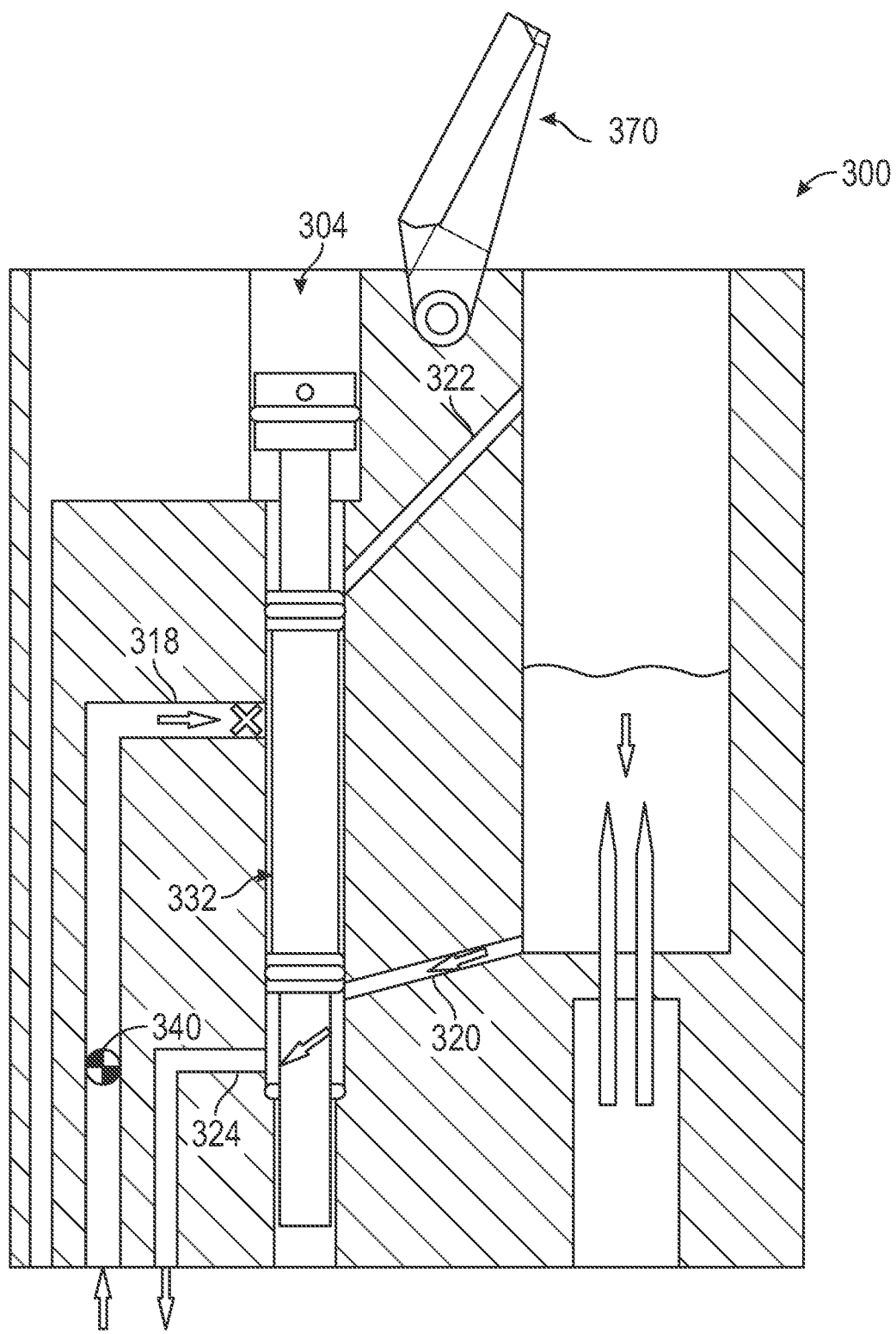
FIG. 9B is a schematic of the implementation of the reversible flow sampler of FIG. 9A in an intermediate shuttle position.
Figure 9C:
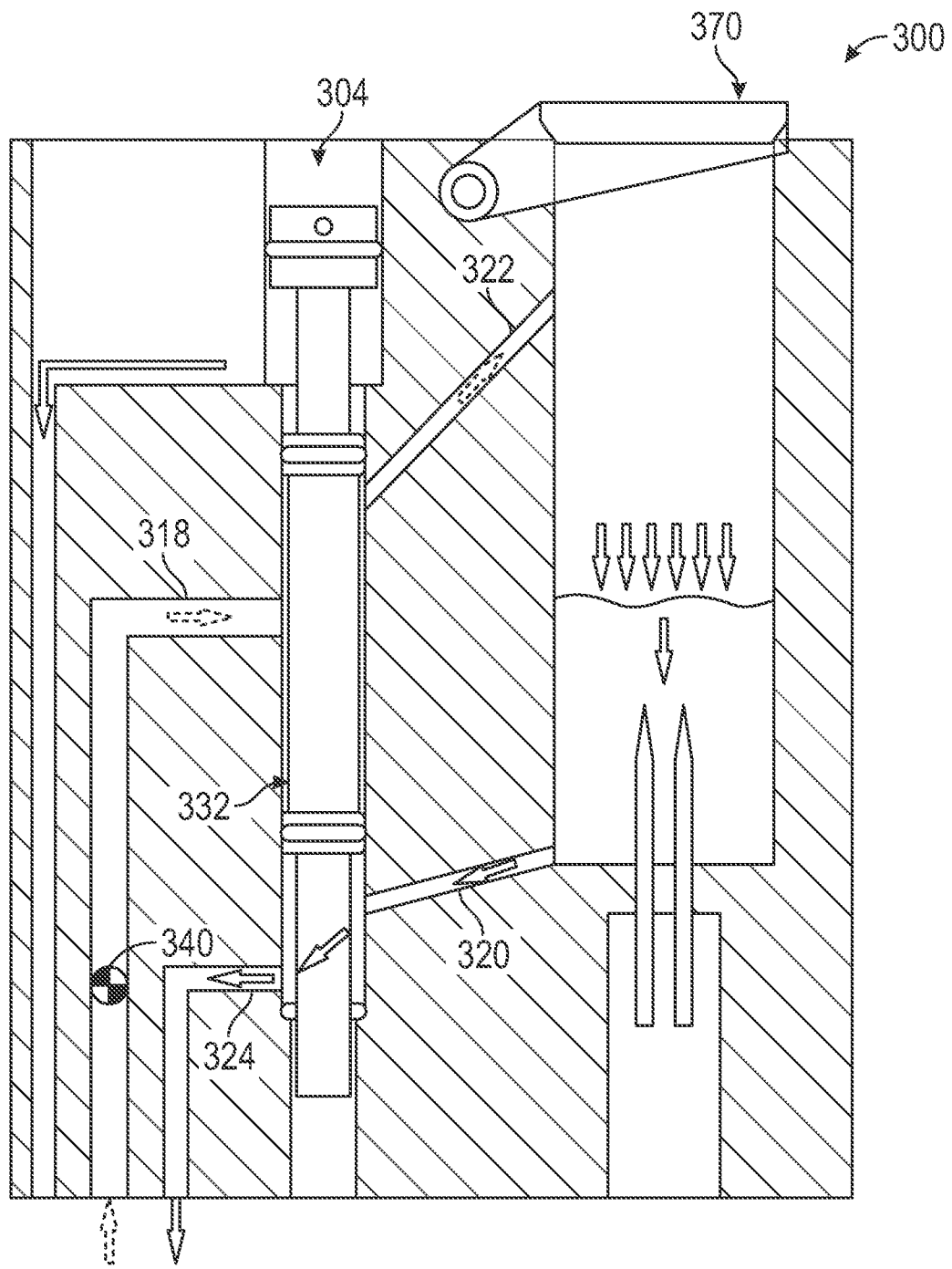
FIG. 9C is a schematic of the implementation of the reversible flow sampler of FIG. 9A in a second shuttle position.

In yet another implementation and as shown in FIGS. 9A-9C, a sampler 300 includes similar structures and features to sampler 200 described above, the differences will be discussed in more detail below, like element numbers will be used to identify like elements. The shuttle body 332 has a first shuttle position as shown in FIG. 9A, an intermediate shuttle position as shown in FIG. 9B, and a second shuttle position as shown in FIG. 9C. The intermediate shuttle position as shown in FIG. 9B is similar to the intermediate shuttle position as shown in FIG. 8B, but the shuttle body 332 is further mechanically coupled with the housing cover assembly 370. The shuttle body 332 is coupled to the housing cover assembly 370 such that when the housing cover assembly 370 is moved to the open position, the housing cover assembly 170 causes the shuttle body 332 to move from either the first shuttle position or the second shuttle position to the intermediate shuttle position as shown in FIG. 9B. The housing cover assembly 370 is coupled to the shuttle body 332 by a mechanical linkage in FIGS. 9A-9C. In some implementations, the shuttle body is mechanically linked to the lid through linkages, pins, and slots as shown in the implementation of FIGS. 5-7B.

Configuration of Exemplary Embodiments

A number of example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A reversible flow sampler comprising:
   a housing having a housing cover moveable between an open position and a closed position;
   a sample chamber defined by the housing, said sample chamber having an inlet and an outlet;
   a first opening defined by the housing;
   a second opening defined by the housing; and
   a shuttle movably disposed within the housing and coupled to the housing cover, the shuttle movable between a first shuttle position and a second shuttle position, wherein:
      in the first shuttle position, the shuttle fluidly connects the first opening with the sample chamber inlet and fluidly connects the second opening with the sample chamber outlet such that a first fluid enters the first opening and exits the second opening, and
      in the second shuttle position, the shuttle fluidly connects the second opening with the sample chamber inlet and fluidly connects the first opening with the sample chamber outlet such that a second fluid enters the second opening and exits the first opening.

2. The reversible flow sampler of claim 1, wherein the first fluid is a liquid and the second fluid is a gas.

3. The reversible flow sampler of claim 1, wherein the first fluid is at ambient pressure within the sample chamber and the second fluid is above ambient pressure within the sample chamber.

4. The reversible flow sampler of claim 1, wherein moving the housing cover from the closed position to the open position causes the shuttle to move from the first shuttle position to the second shuttle position.

5. The reversible flow sampler of claim 1, further comprising an actuator coupled to the shuttle and configured to move the shuttle from the first shuttle position to the second shuttle position.

6. The reversible flow sampler of claim 1, wherein the shuttle comprises at least one radially extending protrusion disposed between the first opening and the second opening.

7. The reversible flow sampler of claim 6, wherein the at least one radially extending protrusion includes at least one O-ring configured to form an airtight seal between the first opening and the second opening.

8. The reversible flow sampler of claim 1, further comprising a sensor for detecting whether the housing cover is in the open position or the closed position.

9. The reversible flow sampler of claim 8, wherein the housing cover forms an airtight seal to the sample chamber in the closed position.

10. The reversible flow sampler of claim 1, further comprising a spring configured to bias the shuttle to the first shuttle position.

11. A system for sampling, the system comprising:
    a first fluid source comprising a first fluid;
    a second fluid source comprising a second fluid;
    a housing having a housing cover moveable between an open position and a closed position;
    a sample chamber within the housing, said sample chamber having an inlet and an outlet;
    a first opening defined by the housing;
    a second opening defined by the housing;
    a shuttle movably disposed within the housing and coupled to the housing cover, the shuttle having a first shuttle position and a second shuttle position; and
    an actuator coupled to the shuttle and configured to move the shuttle from the first shuttle position to the second shuttle position, wherein:
       in the first shuttle position, the shuttle fluidly connects the first fluid source with the first opening and with the sample chamber inlet and fluidly connects the second opening with the sample chamber outlet, and
       in the second shuttle position, said shuttle fluidly connects the second fluid source with the second opening and with the sample chamber inlet and fluidly connects the first opening with the sample chamber outlet.

12. The system of claim 11, wherein the first fluid is a liquid and the second fluid is a gas.

13. The system of claim 11, wherein the first fluid is at ambient pressure and the second fluid is above ambient pressure.

14. The system of claim 11, wherein moving the housing cover from the closed position to the open position causes the shuttle to move from the first to the second shuttle position.

15. The system of claim 11, wherein the sample chamber inlet comprises a vial receptacle having one or more needles.

16. The system of claim 11, wherein the shuttle comprises at least one radially extending protrusion disposed between the first opening and the second opening.

17. The system of claim 16, wherein the at least one radially extending protrusion includes at least one O-ring configured to form an airtight seal between the first opening and the second opening.

18. The system of claim 11, further comprising a sensor configured to detect if the housing cover is in the open position or the closed position.

19. The system of claim 18, wherein the housing cover forms an airtight seal to the sample chamber in the closed position.

20. The system of claim 11, further comprising a spring configured to bias the shuttle to the first shuttle position.

* * * * *